United States Patent
Jones et al.

(10) Patent No.: US 8,141,043 B2
(45) Date of Patent: *Mar. 20, 2012

(54) AUTOMATED BUSINESS PROCESS TESTING THAT SPANS MULTIPLE PLATFORMS OR APPLICATIONS

(75) Inventors: Rodney Gene Jones, Hot Springs Village, AR (US); Linda Hayes Schoendienst, Plano, TX (US)

(73) Assignee: Worksoft, Inc., Addison, TX (US)

( * ) Notice: Subject to any disclaimer, the term of this patent is extended or adjusted under 35 U.S.C. 154(b) by 1173 days.

This patent is subject to a terminal disclaimer.

(21) Appl. No.: 11/781,701

(22) Filed: Jul. 23, 2007

(65) Prior Publication Data

US 2008/0016499 A1    Jan. 17, 2008

Related U.S. Application Data

(63) Continuation-in-part of application No. 11/033,361, filed on Jan. 11, 2005, now Pat. No. 7,600,220.

(51) Int. Cl.
*G06F 9/44* (2006.01)
*G06F 11/00* (2006.01)

(52) U.S. Cl. ........................ 717/124; 714/38.1
(58) Field of Classification Search .......... 717/124–135; 714/37, 38.1, 38.11, 38.12, 38.13, 38.14
See application file for complete search history.

(56) References Cited

U.S. PATENT DOCUMENTS

| | | | |
|---|---|---|---|
| 6,662,312 B1 | 12/2003 | Keller et al. | |
| 7,155,639 B2 | 12/2006 | Gorshenev et al. | |
| 7,185,235 B2 | 2/2007 | Radestock | |
| 7,313,564 B2 * | 12/2007 | Melamed et al. | 717/124 |
| 7,373,636 B2 | 5/2008 | Barry et al. | |
| 7,437,713 B2 | 10/2008 | Beardsley et al. | |
| 7,451,350 B2 * | 11/2008 | Cherny et al. | 714/32 |
| 7,810,070 B2 * | 10/2010 | Nasuti et al. | 717/124 |
| 8,015,541 B1 * | 9/2011 | Srinivasan et al. | 717/104 |
| 2003/0140138 A1 | 7/2003 | Dygon et al. | |
| 2004/0103396 A1 * | 5/2004 | Nehab | 717/127 |
| 2004/0107415 A1 * | 6/2004 | Melamed et al. | 717/124 |
| 2004/0168106 A1 * | 8/2004 | Cherny et al. | 714/32 |

(Continued)

FOREIGN PATENT DOCUMENTS

WO    2006-130684 A2    12/2006
WO    2007-070414 A2    6/2007

OTHER PUBLICATIONS

PCT: International Preliminary Report on Patentability of PCT/US2008/070289 (counterpart application); Jan. 26, 2010; 4 pgs.

(Continued)

*Primary Examiner* — Anna Deng
*Assistant Examiner* — Qing Chen
(74) *Attorney, Agent, or Firm* — Howison & Arnott, L.L.P.

(57) ABSTRACT

A system and method for automated software testing includes defining a data model of an automated software test for a feature or business process being tested and then identifying an address for a function library at a local or remote location for executing the data model of the automated software test based upon the platform of the application. This identified function library is accessed at the address at the local or remote location so that an execution of a function within the function library may be invoked to obtain results therefrom.

23 Claims, 5 Drawing Sheets

U.S. PATENT DOCUMENTS

2004/0194063 A1* 9/2004 Pereira .......................... 717/124
2005/0144591 A1* 6/2005 Banks ........................... 717/122
2005/0172267 A1 8/2005 Bergin
2005/0229043 A1* 10/2005 Nasuti et al. .................... 714/38
2006/0080638 A1 4/2006 Fiore
2006/0156288 A1 7/2006 Jones et al.

OTHER PUBLICATIONS

PCT: International Search Report of PCT/US08/70289; Jan. 28, 2009; 3 pgs.
PCT: Written Opinion of the International Searching Authority of PCT/US08/70289; Jan. 28, 2009; 4 pgs.

* cited by examiner

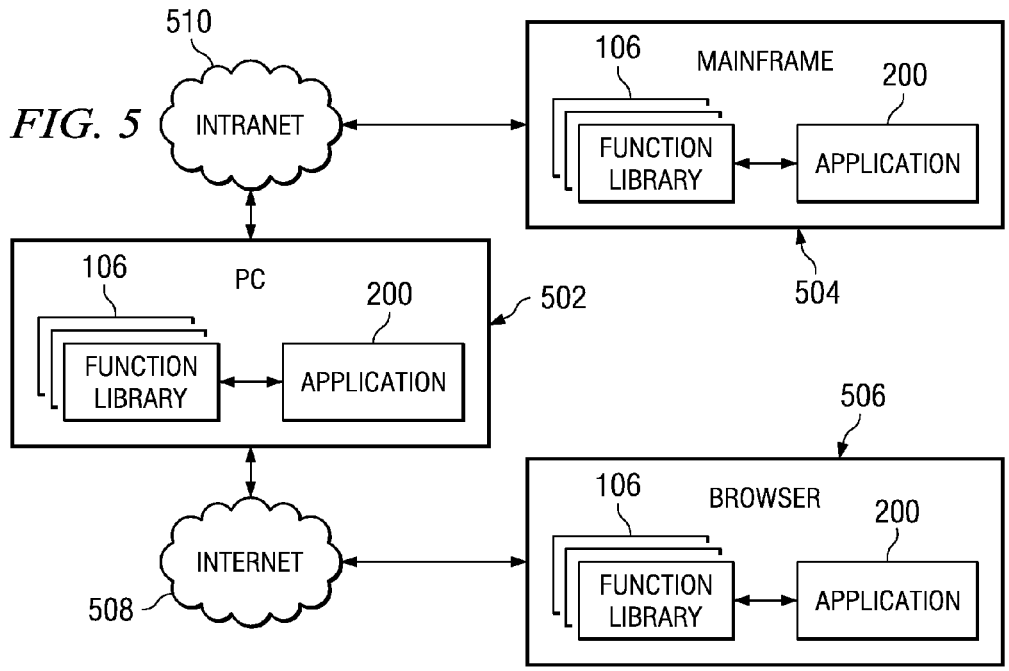
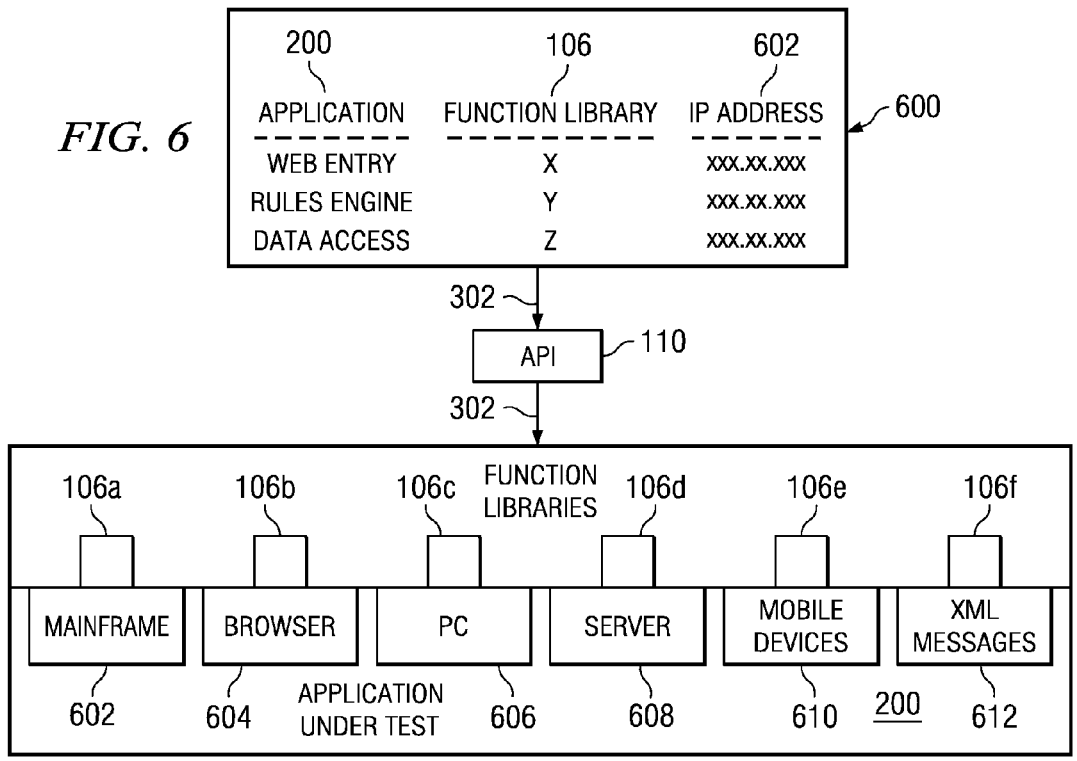

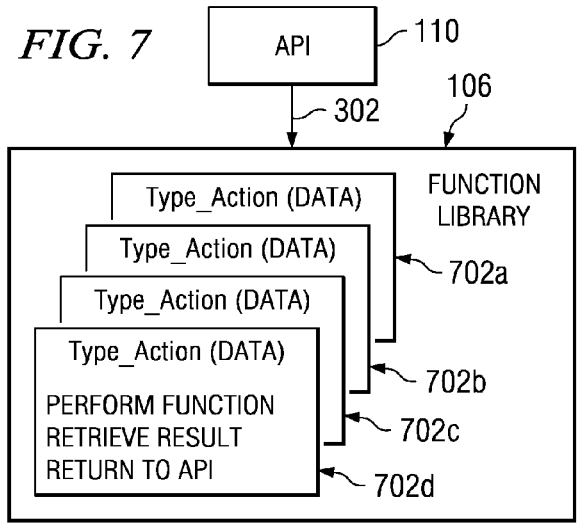
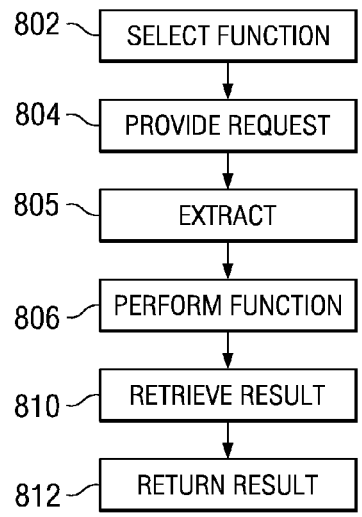
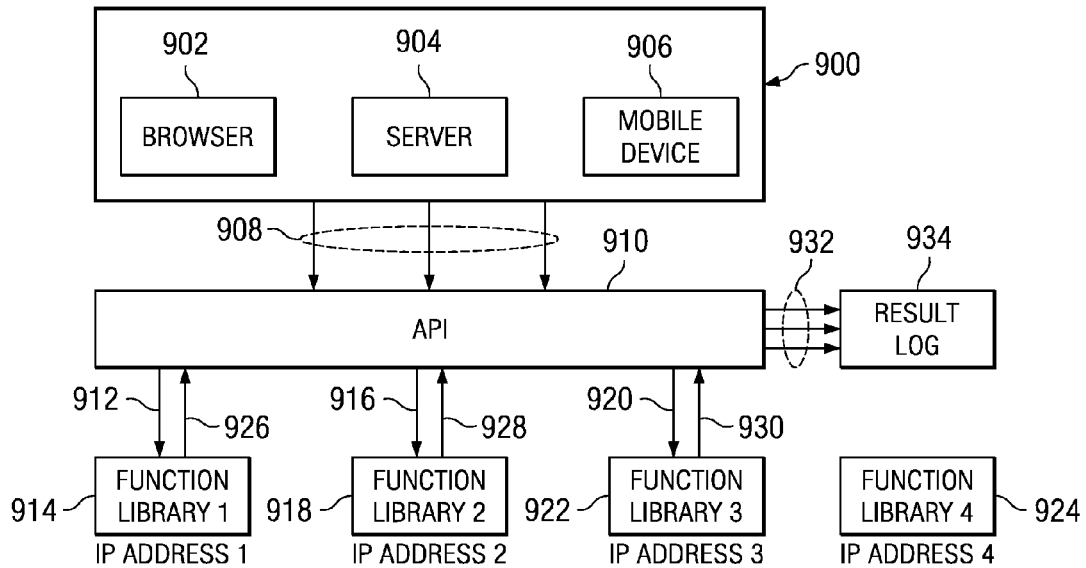

AUTOMATED BUSINESS PROCESS TESTING THAT SPANS MULTIPLE PLATFORMS OR APPLICATIONS

CROSS-REFERENCE TO RELATED APPLICATIONS

This application is a continuation-in-part of U.S. patent application Ser. No. 11/033,361, entitled "EXTENSIBLE EXECUTION LANGUAGE," filed on Jan. 11, 2005, now U.S. Pat. No. 7,600,220, issued on Oct. 6, 2009, which is incorporated herein by reference.

TECHNICAL FIELD

The present invention relates to automated software testing across multiple software platforms, and more particularly, to a method for testing across multiple software platforms using a mix of languages.

BACKGROUND

The implementation of software on a computer system requires that the software be tested in order to confirm that is operating as expected. Historically, software functionality has been tested by creating a large combination of inputs to the software and verifying the outputs against the expected correct response.

To date, these inputs have been supplied and outputs verified either by manual or automated test execution. Manual execution is time and labor intensive, so automation is important to achieve economical test coverage. Scripting languages enable a programmer to automate test execution by simulating manual activity using code.

The problem with using scripting languages is that they are platform specific. Modern applications and business processes comprise components that are distributed over multiple platforms, and functionality may be ported from one platform to another. This requires a means of test automation that can execute across multiple platforms using the languages best suited to each platform, with flexibility to change to different languages should future needs arise.

This need for test procedures that span multiple platforms or applications is exemplified by enterprise planning applications such as SAP software whose functionality may be implemented using one or more platforms, or whose business processes may integrate with third party applications. In either case there is a need to execute tests that span platforms or applications end to end within a single procedure.

SUMMARY

The present invention disclosed and described herein, in one aspect thereof, comprises a system and method for automated software testing. A data model is defined of an automated software test for a business process being tested. The data model may span test steps across multiple applications or multiple components of the same application. An identification is made of at least one available address for a function library at a local or remote location for executing the automated software test based upon a platform of the application being tested. The identified function library is accessed at the local or remote location to invoke an execution of a function in the function library to obtain results from the execution of the function.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a further embodiment of the system of FIG. 2 wherein the system library function tools are distributed over multiple platforms locations;

FIG. 6 is a block diagram illustrating the system enabling automated testing of software, wherein the function libraries are located at a number of IP addresses;

FIG. 7 illustrates a function library;

FIG. 8 illustrates the operation of a function library;

FIG. 9 illustrates an example of testing an application using the described system;

DETAILED DESCRIPTION

Figure 1:
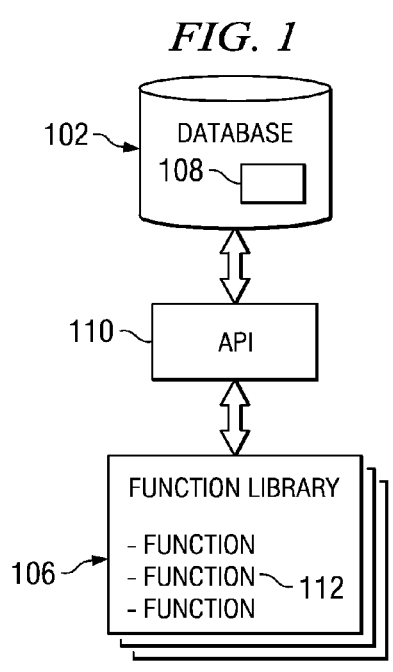
FIG. 1 is a general block diagram illustrating a system for automated application testing.

Referring now to the drawings, and more particularly, to FIG. 1, there is a system and method for automated software testing that enables the automation of test procedures whose definition is independent from a specific platform or scripting language. The system comprises a database 102 containing the test procedures that is logically connected during execution to one or more function libraries 106 containing a number of functions 112 that are specific to a particular language or platform. This database 102 describes the enterprise execution environment including all applications, application components, platforms and their location, and a table 108 that describes how each type of component is recognized and what actions can be performed against it.

The test procedures are constructed within the database 102 by selecting the application, the component within the application, the action to be performed against the component, and the relevant data value(s) to be either input to the software or verified against the output. This data is passed to an application program interface (API) 110 that makes a call to the function library 106 associated with the platform and invokes the function 112 needed to execute the specified action. The function 112 returns its results to the API 110 that in turn logs the results into the database 102. These functions 112 may be written in any language or protocol that is appropriate to the associated platform or software operating environment. Thus, a mix of these functions 112 on different platforms may be executed during a single test procedure, and functions 112 may be substituted if the same test procedure must be executed on another platform.

Platforms are identified by an interface mechanism. This interface mechanism may be operating system dependent or independent, or may be a capability of the development environment used to construct the application. For example, the Windows operating system provides an API for standard application components within its environment as this interface mechanism, while the Java runtime environment is operating system independent and supports accessibility through a standard class. Applications developed using either Java or .NET provide reflection interfaces, and applications executing within a browser may be accessed through the document object model interface. This multiplicity of potential interface mechanisms introduces complexity into the automated test process that this invention addresses.

Software applications may also provide their own interface mechanism for interacting with the software. SAP software, as a specific instance of this, provides an interface known as the SAP GUI API (graphical user interface application programming interface) that allows actions to be performed with and against the components of SAP software for various purposes including the automated execution of tests. SAP software also provides services in the form of XML messages that may be used to invoke business processes and related functionality within the SAP software that may also be used for automated testing. A business process is a transaction such as creating a sales order or generating an invoice that may require the use of one or more software components or applications to complete the transaction.

Figure 10:
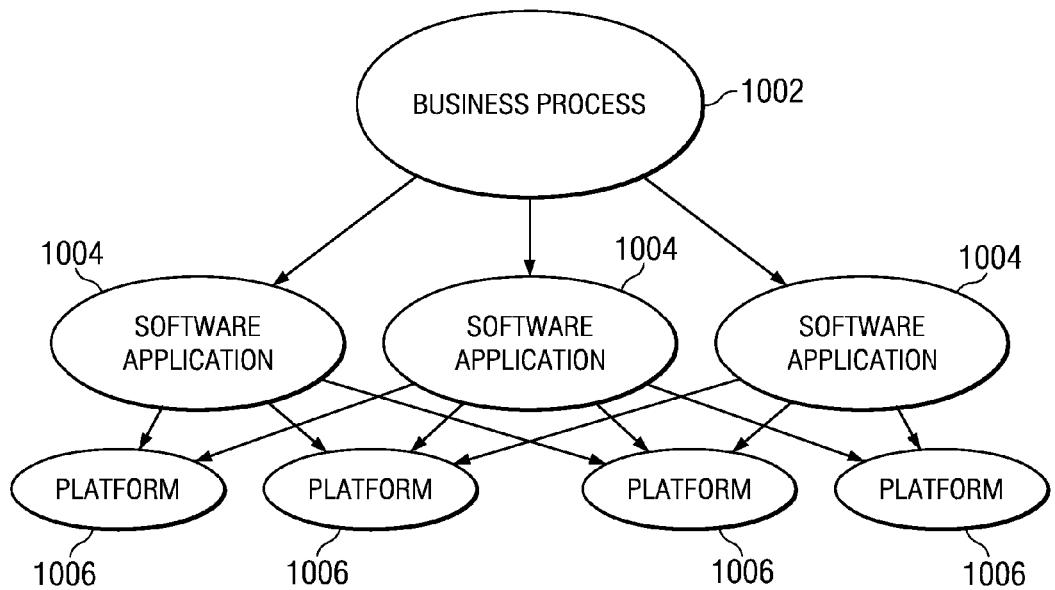
FIG. 10 illustrates a business process.

Referring now to FIG. 10, there is illustrated the manner in which a business process 1002 may be implemented across a plurality of software applications 1004. A business process 1002 could comprise any business application such as generating a sales order or invoice that may require the use of multiple software components or applications 1004 in order to complete the business process. Each of the software components or applications 1004 which are implementing the business process 1002 may be executed on a number of different platforms 1006. Thus, each business process 1002, in addition to requiring operation across multiple software components or applications 1004 require the execution of these components or applications on multiple types of platforms 1006. This of course renders the testing of the business process 1002 a very complex process.

Figure 11:
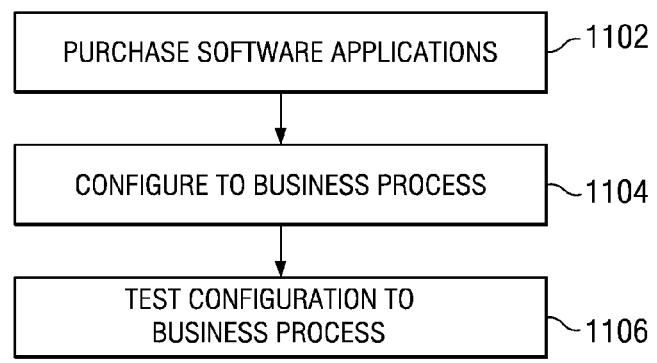
FIG. 11 illustrates configuration and testing of a business process.

Referring now also to FIG. 11, there is illustrated the manner in which a business process 1002 may be implemented and tested to confirm its proper operation. Various software components or applications 1102 necessary to incorporate a desired business process 1002 are purchased at step 1102. The software components or applications 1004 are configured to a desired business process 1002 at step 1104. Once the software has been configured to operate according to the desired business process 1002 on the appropriate platforms 1006, the configuration of the business process is tested at step 1106. The proper operation of the configuration of the software may then be tested.

Figure 2:
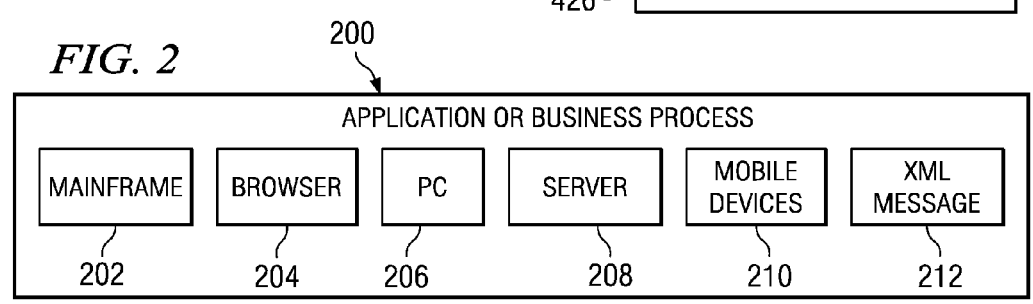
FIG. 2 is a block diagram illustrating a software application or business process that may be executed over multiple platforms.

Referring now to FIG. 2, there is illustrated a software application or business process 200 that requires an automated software testing procedure. The software application or business process 200 may include any type of code operable on any hardware platform or in any software environment. The software application or business process 200 includes components that are distributed across a mainframe 202, a browser 204, a PC 206, a server 208, mobile devices 210 and XML messages 212. The mobile devices 210 may include any number of devices including a mobile telephone personal data assistant, mobile e-mail device, etc. The XML messages 212 may be delivered across multiple transports using various protocols. Thus, the execution of the software application or business process requires the execution of each of these components in different platforms as discussed previously and any testing procedure must demonstrate this behavior.

As can be seen, an automated test procedure using a scripting language formatted only for the mainframe platform would be able to test the inputs and outputs of the mainframe component 202 of the software application or business process 200 but cannot provide testing capabilities with respect to the remaining components. Likewise, scripting languages for mobile devices 210 may not be able to execute components against the mainframe 202, browser 204, PC or server 208. The execution of XML messages may require yet another language depending on the protocol and transport. The limits of a particular scripting language to a specific component greatly limits the use of the scripted language. The manner of overcoming this problem is using multiple scripting languages, one for each separate component. However, composing a testing procedure for each component would require a great deal of programming time.

Figure 3A:
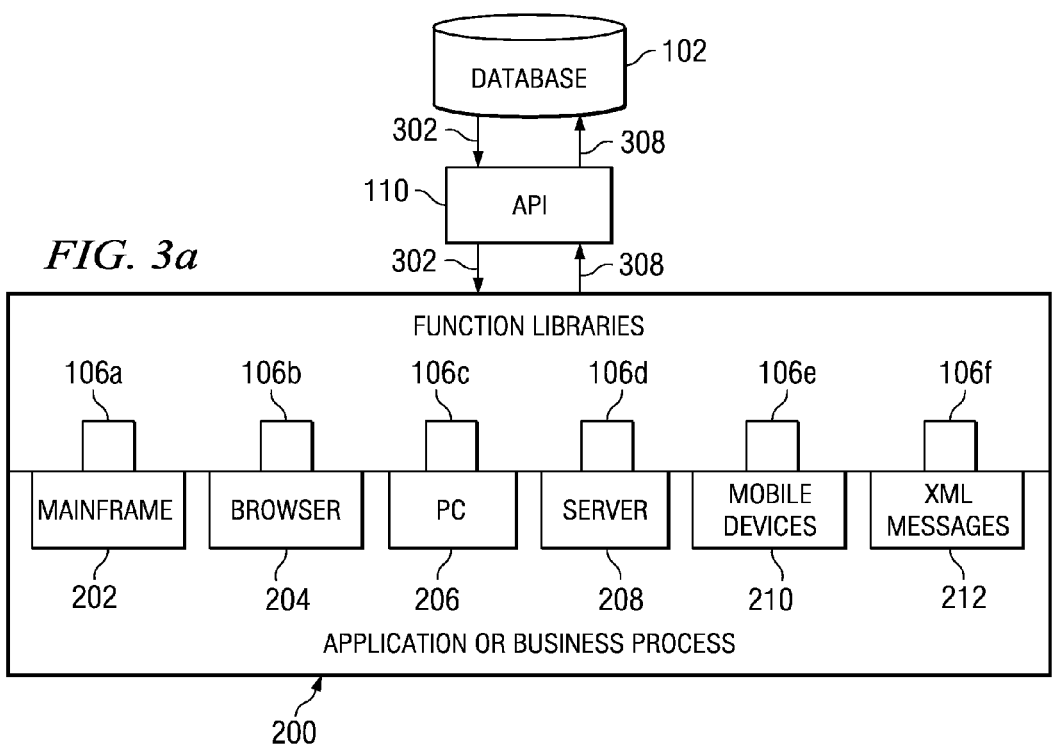
FIG. 3*a* is a block diagram illustrating the system enabling automated testing of software over multiple platforms.
Figure 3B:
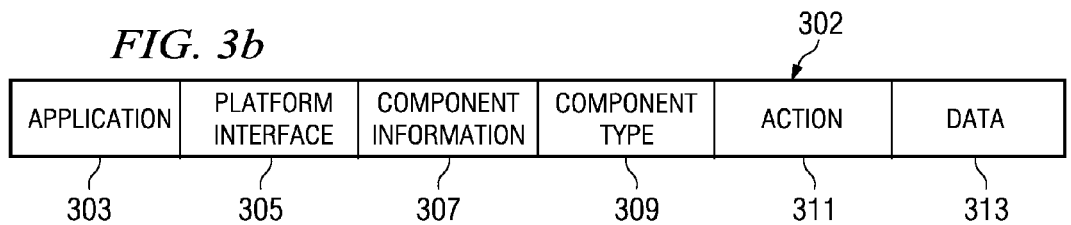
FIG. 3*b* illustrates a test action request.

Referring now to FIG. 3a, there is illustrated a block diagram of the system enabling the automation of software testing across any platform using a mix of scripting languages. The database 102 contains data models of automated test procedures described by actions to be performed on the application and components associated with different platforms to execute tests over each of the components. The data model of the automated test procedure including the application, its platform interface, component, the component type, action and data combined are generated and forwarded from the database 102 to an API 110. The application, its platform interface, the component, the component type, action and data comprises the test action request 302 illustrated in FIG. 3b.

The application 303 includes an indication of the software application that is being tested by the automated testing software. The platform interface information 305 provides an indication of the location of the function library 106a-f for the application being tested. The component information 307 includes an indication of the part of the software application that is to be tested. The component type 309 indicates what kind of component is to be tested. The action information 311 provides an indication of which particular function or activity is to be formed on the selected component type, and the data 313 includes any physical data necessary to carry out the requested action on the component. The test action request 302 enables the API 110 and function libraries 106 a-f to perform any desired test execution.

Referring now back to FIG. 3a, the API 110 selects the particular function 112 from a function library 106a-f based on the platform interface necessary to perform the action forwarded from the database 102 in the test action request 302 and routes the test action request 302 to the proper function library 106 a-f based on the location of the application. The selected function 112 performs the action included within the test action request 302 to generate a particular test result based upon the provided data. The function 112 receives back the actual results, which are compared to the expected results at the function 106. These results 308, including either or both of the actual results and the comparison results, are sent back to the database 102 through the API 110 and saved for logging purposes.

Figure 3C:
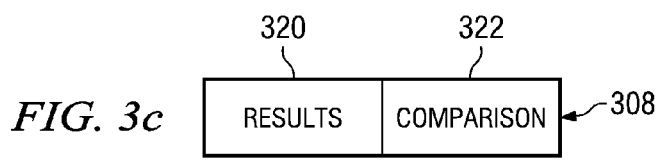
FIG. 3*c* illustrates results provided from a function library.

The function library 106a-f comprises one or more functions 112 each associated with a particular component. Each of the functions 112 executes the test action request 302 and generates a result 308 of the action including any returned data values. The results 308 illustrated in FIG. 3c includes the results 320 provided by function library 106 a-f and the results of the comparison 322 of the results 320 with an expected result. The expected result is provided to the function library 106 a-f from the database 102 in the test action request 302. Using a combination of the functions 112, applications and business processes 200 may be tested over a number of platforms. Thus, for example, the test procedure data model for an application or business process 200 that is executed on a browser 204, PC 206 and a mobile device 210 would provide a set of test action requests that accessed function libraries 106b, 106c and 106e to generate results 308 simulating execution of the application and business process 200 across these components. Each of the functions 112 in the function libraries 106 a-f enable particular actions to be executed on the platform with which the function library 106 a-f is associated. Function library 106a enables the execution of actions on a mainframe platform 102. Function library 106b executes actions against components on a browser platform 106 a-f. Function library 106c executes actions on a PC platform 206. Function library 106d executes actions on a server platform 208 and function library 106e executes actions against components associated with mobile device platforms 210. Function library 106f executes actions on an XML message platform 212.

Figure 4:
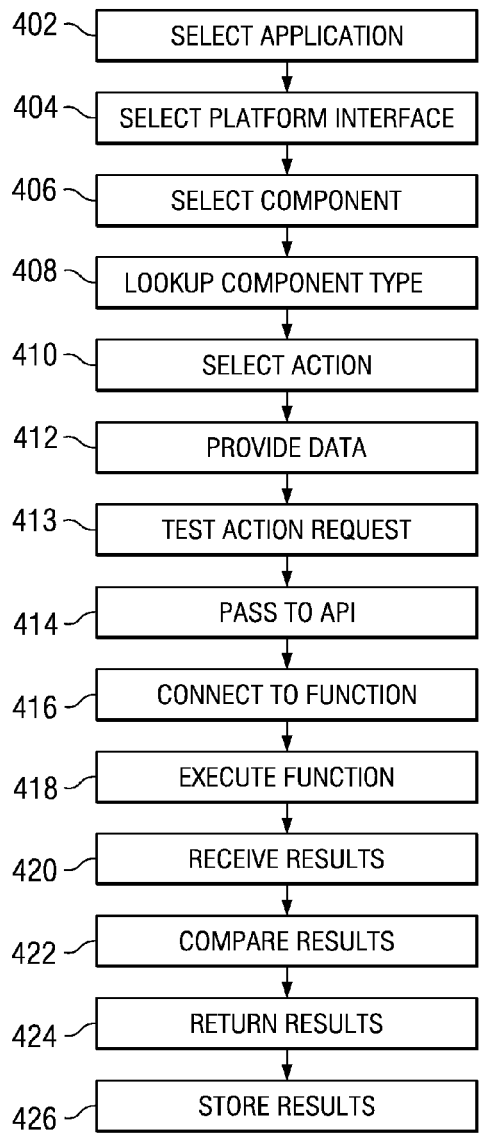
FIG. 4 illustrates the process for executing an automated test over multiple platforms.

Referring now to FIG. 4, there is a flow diagram illustrating the process by which a particular test procedure may use the cross-platform automated software testing functionalities of the present invention. Initially, at step 402, an application or business process to be tested is selected from the database 102. Next, the platform interface of the application or business process 200 is selected at step 404 from a list of the platform interfaces within the database 102. Next, a component within the application or business process 200 is selected at step 406. The component comprises some part of the application that is to be tested by the automated testing process. The database 102 performs at step 408 a lookup of the component type from the database 102. The type of the component describes its characteristics; for example, whether it is a text field, a push button, a menu or a list. Each component type has an associated list of actions that may be performed against the component; for example, input or verify the value in a text box. Next, an action that may be associated with the selected component type is selected at step 410, and all necessary data parameters for performing the selected action on the component are supplied at step 412. This collection of information is stored as a test action request 302 at step 413, and passed to the API 110 at step 414.

The API 110 uses the IP address of the function library 106 a-f within the test action request 302 to connect at step 416 to the associated function 112 in the function library 106a-f necessary for carrying out the software test. The test action request 302 is used to invoke the function 112 to execute at step 418 the information contained in the test action request 302. This process involves performing the provided action on the provided component using any of the data provided in the test action request 302. A result is received from the execution of the function at step 420 and the result may be compared to an expected result at step 422. The results 420 are returned to the database 102 via the API 110 at step 424. The results 420 are stored at step 426 within the database 102.

In FIG. 5, there are illustrated function libraries 106 a-f and an application or business process 200 that resides upon multiple platforms at multiple locations. The function libraries 106 a-f are distributed across a PC platform 502 in a first location, a mainframe platform 504 in a second location and a web browser platform 506 in a third location. Each of these platforms is able to communicate with each other via the Internet 508 or intranet 510. The application or business process 200 is additionally implemented on each of the different platforms illustrated in FIG. 5. The fact that the application or business process 200 may be executed on the PC platform 502, mainframe platform 504 and browser platform 506 require that locations of the function libraries 106a-f must be able to be determined such that the automated test execution may be run. The locations of the function libraries 106a-f are identified by an IP address.

The PC platform 502 includes application or business process 200 and function libraries 106a-f that are associated with execution on the PC platform 502. The PC platform 502 is able to communicate with the mainframe platform 504 via an intranet 510. The intranet 510 may comprise any type of internal network that is implemented within a defined location or area such as a company intranet. The PC platform 502 communicates with the browser platform 506 over the Internet 508. The Internet 508 comprises a worldwide communications network enabling wide spread communication amongst connected entities.

The mainframe platform 504 also includes applications 200 and function libraries 106a-f that are executed within this operating environment. Likewise, the browser platform 506 includes applications 200 and function libraries 106 a-f that are executable and operable within the browser environment. Since the function libraries 106a-f are located and associated with different platforms that are interconnected via an intranet 510 or internet 508, in order for an application program interface to access these function libraries 106a-f to perform automated testing procedures, there is the necessity of some manner for accessing these function libraries 106a-f in different locations.

In FIG. 6 there is illustrated the operation of the automated software testing system of the present invention having function libraries 106 a-f located at a number of locations having separate IP addresses. Thus, the mainframe 602, browser 604, PC 606, server 608, mobile devices 610, and XML message 612 and the associated functions 112 of the function libraries 106 a-f are at separate locations associated with separate IP addresses. In order to make it possible for the API 110 to locate a particular function 112 in a function library 106 a-f, each function library 106 a-f will have associated therewith an IP address. The function library 106 a-f at that location associated with the application or business process is accessed via the Internet 508 or an intranet 510 using this IP address. In this manner, the API 110 may access functions 112 by routing test action requests 302 to and receiving results from the IP address which is associated with the function library 106a-f.

The table 600 containing the information including the application or business process 200, function library 106 a-f and IP address 602 is contained within the database 102 described with respect to FIG. 1. In this manner, a much greater variety of function libraries 106 a-f may be accessed since a user is not limited to those function libraries contained within the processing entity with which the user is working but may access any platform containing function libraries 106 a-f that are accessible via some type of intranet or Internet network.

Referring now to FIG. 7, there is illustrated a function library 106 a-f which is comprised of a set of functions 702a-d that are each associated with a component type and the action to be performed against the component type and the process performed by the function 112. The API 110 passes the test action request 302 that contains the component, component type, action and data to the function library 106a-f and the function library 106a-f selects the function 702 that is associated with the selected action and component type. This function 702 executes the action and retrieves the result, which is returned to the API 110. The particular function 702 within the function library 106a-f that is selected for generating the execution results is selected based upon the component selected, the type of action that is being performed and the data upon which the action is to be performed. The function library 106a-f is at a location having an associated IP address.

The operation of the function library 106a-f is more fully illustrated in FIG. 8, wherein, once the function is selected at step 802, the test action request 302 is provided to the selected function 112 at step 804. The function 112 extracts at step 805 the provided data from the test action request 302 and uses this data to perform the particular action associated with the selected function on a particular component at step 806. This operation provides a particular result and this result is retrieved at step 810 such that the results may be provided back to the application program interface at step 812. Alternatively, results from step 810 may be compared to an expected result and this result is additionally provided back to the API at step 812. In this manner, for the selected action and associated data, automated execution may be performed on any number of platforms or software operating environments.

Referring now to FIG. 9, there is provided a particular example wherein the system of the present disclosure is used to execute tests for an application or business process 900. The application or business process 900 includes three components, a browser component 902 that is operable within a browser environment, a server component 904 that is operable within a server environment and a mobile device component 906 that is operable within a mobile device environment. A test action request 908 is created for each of these components. The makeup of the test action request 908 depends upon the particular action that is desired to be tested with respect to the application or business process 900 for the associated component. While the disclosure with respect to FIG. 9 illustrates a test action request 908 being created for each of the browser component 902, server component 904 and mobile device component 906, a user might desire to test only a single one or pair of these components, in which case there would only be one or two test action requests 908 provided to the application program interface 910. Additionally, any component of the application or business process 900 may be tested in addition to those discussed above.

The application program interface 910 utilizes the IP address information within each of the test action requests 908 to route the test action request to three different function libraries associated at three different locations having separate IP addresses. For the test action request 908 for the browser component 902, the API routes the test action request at 912 to function library one 914 at IP address one. For the server component 904, the test action request 908 is routed at 916 from the API to a function library two 918 at IP address two. Finally, the test action request 908 for the mobile device component 906 is routed to function library three 922 at 920 wherein the function library three 922 is located at IP address three. It is noted that no test action request 908 is transmitted to function library four 924 at IP address four since no component requiring the functions of function library four is included within the application 900 being tested.

Each of the function libraries 914, 918 and 922 generates a result in the manner described hereinabove responsive to each of the test action requests 908 received from the application program interface 910. The results may be compared with an expected result in the test action request 908 to see if they match. The function libraries 914, 918 and 922 transmit the results back to the API 910. Function library one 914 transmits the results of the test for the browser component to the API at 926. Function library two 918 transmits the results for the test of the server component 904 back to the API at 928. Function library three 922 transmits the results of the test for the mobile device component 906 back to the API at 930. Each of the results received at the API 910 is transmitted from the API 910 at 932 to a result log 934. There are three separate results transmitted from the API 910 to the result log 934 at 932 since there are three separate results coming from each of the function libraries 914, 918 and 922. Each of these results are associated with a separate test for each of the browser component 902, server component 904 and mobile device component 906, respectively. The result log 934 then has three separate results stored therein that may be accessed by the user to determine the results of a test for application 900.

Although the preferred embodiment has been described in detail, it should be understood that various changes, substitutions and alterations can be made therein without departing from the spirit and scope of the invention as defined by the appended claims.

The invention claimed is:

1. An apparatus, comprising:
 a non-transitory computer-readable storage medium containing a set of instructions for a general purpose computer;
 wherein execution of the set of instructions by the general purpose computer enables the general purpose computer to:
 define within a database a generic data model of a business process that is independent of a specific execution platform for testing the business process that operates across a plurality of execution platforms during execution, wherein the generic data model of the business process includes the business process, a data component, a component type, an action to be performed on the data component and an expected result of the action performed on the data component that may be implemented on the plurality of execution platforms;
 identify at least one available location for at least one function library for implementing the generic data model of the business process for testing each of the plurality of execution platforms for the business process that is operating across the plurality of execution platforms;
 access the identified at least one function library for each of the plurality of execution platforms;
 execute the generic data model of the business process using at least one function in the identified at least one function library for each of the plurality of execution platforms and obtaining test results therefrom; and
 return the test results of the execution to the database.

2. The apparatus of claim 1, wherein the execution of the set of instructions by the general purpose computer further enables the general purpose computer to:
 select the business process from the database;
 select a location of a platform for the business process;
 select a component from the business process;
 look up a component type in the database;
 select an action to be performed on the component based on its type; and
 provide data parameters for the action.

3. The apparatus of claim 1, wherein the execution of the set of instructions by the general purpose computer further enables the general purpose computer to look up the at least one available location in the database and retrieve an Internet Protocol (IP) address associated with the identified at least one function library for the business process.

4. The apparatus of claim 1, wherein the execution of the set of instructions by the general purpose computer further enables the general purpose computer to compare the test results of the execution against expected test results.

5. The apparatus of claim 4, wherein the execution of the set of instructions by the general purpose computer further enables the general purpose computer to return the test results of the execution and the comparison to the database.

6. The apparatus of claim 1, wherein the execution of the set of instructions by the general purpose computer further enables the general purpose computer to store the test results in the database.

7. A system for providing automated software testing, comprising:
  a database, stored on a non-transitory machine readable medium, for enabling a creation and storage of a generic data model of a business process that is independent of a specific execution platform for testing the business process that operates across a plurality of execution platforms during execution, wherein the generic data model of the business process includes the business process, a data component, a component type, an action to be performed on the data component and an expected result of the action performed on the data component that may be implemented on the plurality of execution platforms;
  a plurality of function libraries, stored on a non-transitory machine readable medium, including functions, each function for implementing specific actions necessary for executing the generic data model of the business process for a particular execution platform of the plurality of execution platforms; and
  an application program interface (API), stored on a non-transitory machine readable medium, located between the database and the plurality of function libraries, for locating and selecting an appropriate function library and for invoking the specific actions with the plurality of function libraries for executing the generic data model of the business process for the plurality of execution platforms on which the business process is being tested.

8. The system of claim 7, wherein the plurality of function libraries execute a selected action against a selected component.

9. The system of claim 7, wherein the database further comprises:
  data describing a plurality of applications;
  data describing a plurality of platforms and their locations, a set of application components, each representing a field or control for receiving or returning data or status in an application;
  data describing a plurality of component types; and
  data describing a plurality of actions that may be associated with the plurality of component types.

10. The system of claim 7, wherein the API selects one of the plurality of function libraries responsive to testing the business process based on an Internet Protocol (IP) address provided by the database.

11. The system of claim 7, wherein the plurality of function libraries are written in a plurality of programming languages enabling execution across the plurality of execution platforms across which the business process may be executed.

12. The system of claim 7, wherein the plurality of function libraries provide data describing an actual test result of execution of a selected component and a selected action.

13. A method for automated software testing, comprising the steps of:
  defining within a database a generic data model of a business process that is independent of a specific execution platform for testing the business process that operates across a plurality of execution platforms during execution, wherein the generic data model of the business process includes at least one application, a data component, a component type, an action to be performed on the data component and an expected result of the action performed on the data component that may be implemented on the plurality of execution platforms;
  identifying at least one available location for at least one function library for implementing the generic data model of the business process based on each of the plurality of execution platforms for the business process;
  accessing the identified at least one function library for each of the plurality of execution platforms;
  executing the generic data model of the business process using at least one function in the identified at least one function library for each of the plurality of execution platforms at a remote location and obtaining test results therefrom;
  returning the test results of the execution to the database; and
  storing the test results of the execution in the database.

14. The method of claim 13, wherein the step of defining within the database the generic data model of the business process further comprises the steps of:
  selecting the at least one application from the database;
  selecting a location of a platform for the at least one application;
  selecting a component from the at least one application;
  looking up a component type in the database;
  selecting an action to be performed on the component based on its type; and
  providing data parameters for the action.

15. The method of claim 13, wherein the step of identifying further comprises the steps of looking up the at least one available location in the database and retrieving an Internet Protocol (IP) address associated with the identified at least one function library for the at least one application.

16. The method of claim 13 further including the step of comparing the test results of the execution against expected test results.

17. The method of claim 16, wherein the step of returning further includes the step of returning the test results of the execution and the comparison to the database.

18. A system for automated software testing, comprising:
  means for defining within a database a genetic data model of a business process that is independent of a specific execution platform for testing the business process that operates across a plurality of execution platforms during execution, wherein the genetic data model of the business process includes at least one application, a data component, a component type, an action to be performed on the data component and an expected result of the action performed on the data component that may be implemented on the plurality of execution platforms;
  means for identifying at least one available location for at least one function library for implementing the generic data model of the business process based on each of the plurality of execution platforms for the business process;
  means for accessing the identified at least one function library for each of the plurality of execution platforms;
  means for executing the generic data model of the business process using at least one function in the identified at least one function library for each of the plurality of execution platforms at a remote location and obtaining test results therefrom; and
  means for returning the test results of the execution to the database.

19. The system of claim 18, wherein the means for defining within the database the generic data model of the business process further comprises:

means for selecting the at least one application from the database;

means for selecting a location of a platform for the at least one application;

means for selecting a component from the at least one application;

means for looking up a component type in the database;

means for selecting an action to be performed on the component based on its type; and means for providing data parameters for the action.

20. The system of claim 18, wherein the means for identifying further comprises:

means for looking up the at least one available location in the database; and means for retrieving the Internet Protocol (IP) address associated with the identified at least one function library for the at least one application.

21. The system of claim 18 further including means for comparing the test results of the execution against expected test results.

22. The system of claim 21, wherein the means for returning further includes means for returning the test results of the execution and the comparison to the database.

23. The system of claim 18 further including means for storing the test results in the database.

* * * * *